United States Patent [19]

Rim et al.

[11] 4,026,963

[45] May 31, 1977

[54] N-(o OR p-THIOPHENYL) SUBSTITUTED POLYHALO-5-NORBORNENE-2,3,-DICARBOXIMIDE FLAME RETARDANTS AND POLYMERS CONTAINING SAID IMIDES

[75] Inventors: Yong Sung Rim, Cheshire; Walter Nudenberg, Newtown, both of Conn.

[73] Assignee: Uniroyal Inc., New York, N.Y.

[22] Filed: Aug. 21, 1975

[21] Appl. No.: 606,689

[52] U.S. Cl. .................. 260/859 R; 260/2.5 AJ; 260/45.75 B; 260/45.8 N; 260/326 C
[51] Int. Cl.² ............... C08K 5/37; C07D 209/34; C08K 5/36
[58] Field of Search ........... 260/45.75 B, 45.8 N, 260/326 C, 2.5 AJ, 578, 859 R

[56] References Cited

UNITED STATES PATENTS

| | | | |
|---|---|---|---|
| 2,130,242 | 9/1938 | Messer | 260/578 |
| 2,795,589 | 6/1957 | Bluestone | 260/326 C |
| 3,542,805 | 11/1970 | Cyba | 260/326 C |
| 3,574,230 | 4/1971 | Cyba | 260/326 C |
| 3,748,340 | 7/1973 | Hayes | 260/45.8 N |
| 3,884,849 | 5/1975 | Molbert | 260/2.5 AJ |

Primary Examiner—V. P. Hoke
Attorney, Agent, or Firm—James J. Long

[57] ABSTRACT

This invention relates to N-(o- or p-thiophenyl) substituted polyhalo-5-norbornene-2,3-dicarboximides, their preparation via a one-step process and their use as flame retardants for polyurethane elastoplastics and other polymeric materials.

9 Claims, No Drawings

N-(o- OR p-THIOPHENYL) SUBSTITUTED POLYHALO-5-NORBORNENE-2,3,-DICARBOXIMIDE FLAME RETARDANTS AND POLYMERS CONTAINING SAID IMIDES

This invention is directed to certain novel compounds, their preparation and their use as flame retardants for certain polymeric materials.

U.S. Pat. No. 3,734,758 (May 22, 1973; Universal Oil Products) describes a flame retardant for polymeric compositions which is somewhat similar in structure to the flame retardant claimed herein. However, the flame retardant chemicals of this patent do not contain sulfide or free mercaptan groups. It is considered that the sulfide or free mercaptan groups, in conjunction with the other components, of the chemicals of the present invention are responsible for the unique, non-dripping, flame-proofing properties which are imparted to polyurethane elastoplastics by these chemicals.

It is an object of this invention to provide excellent flame retardant chemicals.

It is a further object to provide a non-step process for the preparation of these chemicals.

It is another object to utilize these chemicals for flameproofing certain polymeric materials.

The present invention provides compounds of the following formulas I and II:

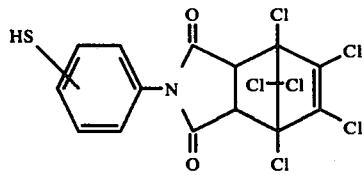

wherein the sulfhydryl substituent on the aromatic ring may be in either the ortho or the para position.

The systematic name of the ortho isomer is:
N-(2-mercaptophenyl)-1,4,5,6,7,7-hexachloro-5-norbornene-2,3-dicarboximide. ($C_{15}H_7Cl_6NO_2S$).

The systematic name of the para isomer is:
N-(4-mercaptophenyl)-1,4,5,6,7,7-hexachloro-5-norbornene-2,3-dicarboximide. ($C_{15}H_7Cl_6NO_2S$).

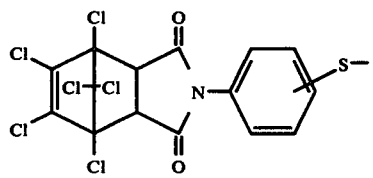

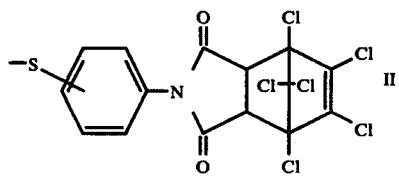

wherein the point of attachment of the -S-S- group on the respective aromatic rings is either ortho or para to the carbon atoms that are attached to the nitrogen atoms.

The systematic name of the ortho isomer is:
N,N'-(dithio-di-o-phenylene)bis-1,4,5,6,7,7-hexachloro-5-norbornene-2,3-dicarboximide. ($C_{30}H_{12}Cl_{12}N_2O_4S_2$).

The systematic name of the para isomer is:
N,N'-(dithio-di-para-phenylene)bis-1,4,5,6,7,7-hexachloro-5-norbornene-2,3-dicarboximide.

Conventionally, dicarboximides are made by a rather cumbersome, two-step synthesis as follows:

STEP 1

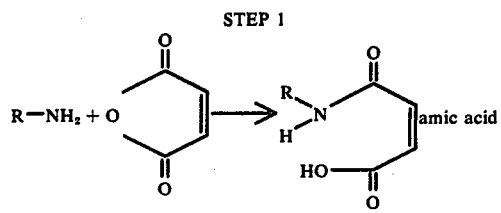

The first step involves the ring opening of the anhydride to form an "amic" acid which can be isolated as a definite compound.

STEP 2

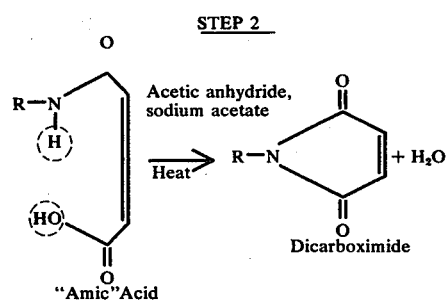

Step 2 involves heating the amic acid in the presence of acetic anhydride and sodium acetate to form the original 5-membered ring system of the anhydride in which the ring oxygen atom has been replaced by a nitrogen atom.

By substituting a 1,4,5,6,7,7-hexahalobicyclo[2.2.1]-help-5-ene-2,3-dicarboxylic anhydride for the simple anhydride, as in the process of this invention, it has been found, unexpectedly, that the dicarboximide forms directly. In this reaction, presumably, the initially formed amic acid goes spontaneously to the cyclic imide form by the elimination of water. Thus, almost 100% conversion to the imide can be achieved by distilling off the water with the aid of a Dean-Stark water trap. The spontaneous cyclization reaction is unique, there being no known examples in the prior art. This self-cyclization reaction appears to be due to the special stereochemical arrangement of the hexachloronorbornene type amic acid structure.

In general, the reaction is carried out by using a given molar quantity of the aromatic amine or diamine with a slight molar excess, about 10%, of the polyhaloanhydride. The reaction mixture is heated to reflux and maintained thus while water is split out, removed from the reaction zone and collected in a suitable apparatus such as a Dean-Stark water trap. The end of the reaction is denoted by the elimination of the theoretical quantity of water and further by the fact that the reaction will not eliminate additional water on continued refluxing.

Thus, the dicarboximides of Formula I were made by reacting 1 mole of chlorendic anhydride with one mole each of 2-mercaptoaniline and 4-mercaptoaniline, respectively. The dicarboximides of Formula II were made by reacting 2 moles of chlorendic anhydride with one mole each of bis(ortho-thioaniline) and bis(para-thioaniline), respectively.

The reaction is normally carried out in the presence of an inert solvent for the anhydride. Such solvents suitably have a boiling point in the range from about 100° C. to about 115° C. A typical hydrocarbon solvent is toluene, and a typical solvent containing carbon, oxygen and hydrogen is dioxane.

In general, reaction times will vary from about 30 minutes to about 12 hours. A catalyst, such as sulfuric acid or para-toluene sulfonic acid, may optionally be used for this reaction.

The compounds of the present invention find use as flame retardants for polymeric materials, such as polyurethane elastoplastics, poly(alpha olefin) thermoplastics, ethylene-propylene-non-conjugated diene (EPDM) elastomers and the like. For this purpose, the compounds can be mixed with the polymer by any one of several methods, viz., (1) by addition to the polymer while the latter is dissolved in a suitable solvent--this procedure being especially useful when it is desired to incorporate the compound during the polymer manufacturing process; and (2) mixing in conventional rubber or plastic mixing machinery, such as an integral mixer of the Banbury type and/or an open mixer of the differential roll mill type, until a uniform mixture is obtained. Elevated temperatures (e.g., 300°–420° F.) aid the mixing, and for best results it is desirable that a temperature sufficiently elevated to flux the polymer and the compound be reached during at least part of the mixing cycle. Alternatively, the polymer and the compound may be dry-blended in the finely divided state so that an intimate mixture is obtained upon subsequent molding or extrusion.

The amount required for imparting flame retardance to various polymers is in the range of from about 5 to 50% by weight of the polymer composition, preferably from about 15 to 40% by weight.

Improved flame retardance can be provided by incorporating metallic compounds wherein the metal is selected from the group consisting of antimony, arsenic and bismuth in an amount of from about 1 to 30% by weight of the said polymeric composition. Antimony oxide is the antimony compound that is preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise, the esters of antimonius acids and their pentavalent derivatives are disclosed in U.S. Pat. No. 2,993,924 such as tris(n-octyl) antimonite, tris(2-ethylhexyl) antimonite, tribenzyl antimonite, tris(beta-chloroethyl) antimonite, tris(beta-chloropropyl) antimonite, tri(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

When the compounds of this invention are used in admixture with polymeric materials to produce flame retardant compositions, these compositions may include, as additional fire retardant additives, polymeric halogen-containing hydrocarbons, namely, chlorinated polyethylene, polyvinyl chloride and neoprene. Such additives are suitably used in an amount of from about 5 to about 50% by weight, based on the total composition.

Stabilizers, fillers and/or pigments and the like may also be incorpoated in the compositions of this invention.

The following examples will serve to illustrate the practice of this invention in more detail.

EXAMPLE 1

Preparation of N-(2-mercaptophenyl)-1,4,5,6,7,7-hexachloro-5-norobornene-2,3-dicarboximide A 3000 ml 3-neck round bottom flask, equipped with a Dean-Stark water trap and a mechanical stirrer, was charged with 203.5 g (10% molar excess) of chlorendic anhydride and 1600 ml of toluene. Sixty-two grams of 2-mercaptoaniline was added to the resultant solution, whereupon a pale yellow suspension was formed. The reaction mixture was heated gradually until the solvent began to reflux and the evolution of water commenced and it was collected in the Dean-Stark water trap. The heating and refluxing were continued until the calculated amount of water, 9 ml. was collected, this requiring a total of 6 hours. At this point, there was no solid left in the reaction mixture. Solvent was then distilled to reduce the volume to about one-half. The residue, a clear solution, was then poured into 1000 ml of Skellysolve B (a mixture of hexanes, b. pt. = 146°–156° F., from Skelly Oil Co.) and the resultant solid was separated by filtration on a Buchner funnel and dried in air overnight. One crystallization from toluene gave white crystals of the dicarboximide with a melting point of 195°–8° C.

Elemental Analysis %: Calc'd for $C_{15}H_7Cl_6NO_2S$: C, 37.70; H, 1.47; N, 2.93; S, 6.73; Cl, 44.95. Found: C, 37.71; H, 1.50; N, 2.90; S, 6.22; Cl, 45.17.

The infrared spectrum showed a strong imide carbonyl peak at 1710 $cm^{-1}$ and no peak at 1500 $cm^{-1}$, showing the absence of free —NH. There was no peak at the OH region, which is good evidence that the amic acid had indeed cyclized. The proton magnetic resonance spectrum showed the presence of an SH peak at 882 Hz, four aromatic protons at 730 to 804 Hz and two bridgehead protons at 400 to 495 Hz as a multiplet, thereby establishing the presence and location of each of the seven protons (H atoms) as required by the structure of the subject dicarboximide.

EXAMPLE 2

Preparation of N-(4-mercaptophenyl)-1,4,5,6,7,7-hexachloro-5-norbornene-2,3-dicarboximide A 1000 ml 3-neck flask, equipped with a Dean-Stark water trap and a mechanical stirrer, was charged with 102 g (10% molar excess) of chlorendic anhydride, 400 ml toluene and 300 ml of dry dioxane. Thirty-one grams of 4-mercaptoaniline were then added to the resultant solution, whereupon a pale yellow solid formed instantly. The reaction mixture was heated gradually until the solvent began to reflux, at which point the evolution of water commenced and the solid disappeared. About 4.5 ml of water were collected in about 3 hours. Solvent was then distilled to reduce the volume to about one-half its original volume. The resultant solution, when cooled to room temperature, deposited white crystals of the carboximide. The crystals were separated by filtration and dried overnight at room temperature. The melting point of the carboximide was 237°–240° C.

Elemental Analysis %: Calc'd for $C_{15}H_7Cl_6NO_2S$: C, 37.70; H, 1.47; N, 2.93; S, 6.73; Cl, 44.95. Found: C, 38.06; H, 1.53; N, 3.13; S, 7.35; Cl, 42.78.

The infrared spectrum showed a peak at 1710 cm$^{-1}$ due to the presence of an imide carbonyl group. No peak was observed in the 1500–1550 cm$^{-1}$ region indicating the absence of an NH group, and no peak was observed above the 3000 cm$^{-1}$ region indicating the absence of an OH group of the acid. The foregoing spectrum indicates that the cyclization reaction was completed. The proton magnetic resonance spectrum showed the presence of four aromatic protons as an AB pattern at 740 to 697 Hz and two bridgehead protons at 398 Hz, thereby establishing the presence and location of six of the seven protons (H atoms) as required by the structure of the subject dicarboximide.

EXAMPLE 3

Preparation of
N,N'-(dithiodi-o-phenylene)bis-1,4,5,6,7,7-hexachloro-5-norbornene-2,3-dicarboximide A 3000 ml 3-neck flask, equipped with a Dean-Stark water trap and a mechanical stirrer, was charged with 163 g of chlorendic anhydride, 800 ml of toluene and 800 ml of dry dioxane. Upon the addition of 49.6 g of 2,2'-dithiodianiline and 2 ml of concentrated sulfuric acid, a finely divided, yellow suspension formed. The reaction mixture was heated slowly with stirring until the solvent began to reflux, whereupon the evolution of water commenced and was collected in the Dean-Stark water trap. In 6 hours, about 9 ml of water was collected and the yellow solid had disappeared, leaving a clear solution. About 800 ml of the mixed solvent were removed by distillation, and, upon cooling of the residual solution, a white crystalline solid formed. This solid, the dicarboximide, after drying overnight, had a melting point of 285°–288° C.

Elemental Analysis, %: Calc'd for $C_{30}H_{12}Cl_{12}N_2O_4S_2$: C, 37.70; H, 1.25; N, 2.93; S, 6.71; Cl, 44.70. Found: C, 37.76; H, 1.10; N, 2.90; S, 6.84; Cl, 43.42.

The infrared spectrum showed a strong imide carbonyl peak at 1710 cm$^{-1}$. There was no peak at 1500–1550 cm$^{-1}$ region indicating the absence of an NH group. The peak characteristic of the OH group of the acid group was also missing. The proton magnetic resonance spectrum showed the presence of aromatic protons in the 758 to 689 Hz region as a complex multiplet and bridgehead protons as a singlet at 410 Hz in the ratio of two to one as required by the structure of the subject dicarboximide.

EXAMPLE 4

Preparation of
N,N'-(dithiodi-p-phenylene)bis-1,4,5,6,7,7-hexachloro-5-norbornene-2,3-dicarboximide A 5000 ml 3-neck round bottom flask, equipped with a Dean-Stark water trap and a mechanical stirrer, was charged with 407 g (1.1 moles, 10% molar excess) of chlorendic anhydride. Eighteen hundred ml of premixed 50/50 volume ratio of toluene/dioxane were added. To the resultant solution were added 124 g (0.5 mole) of 4,4'-dithiodianiline and 5 ml of concentrated sulfuric acid. The reaction mixture was heated slowly with stirring until the solvent began to reflux, whereupon the evolution of water commenced and was collected in the Dean-Stark water trap. In six hours, about 18 ml of water were collected. Excess solvent was then distilled off to reduce the volume to one-half its original volume. The remaining solution was cooled and poured into 2000 ml of Skellysolve B, and the resultant slightly gray colored solid was separated by filtration on a Buchner funnel and dried in air overnight. One recrystallization from absolute ethanol gave a white solid, the carboximide, melting at 255°–258° C.

Elemental Analysis, %: Calc'd for $C_{30}H_{12}Cl_{12}N_2O_4S_2$: C, 37.70; H, 1.25; N, 2.93; S, 6.71; Cl, 44.70. Found: C, 36.57; H, 1.31; N, 2.94; S, 7.02; Cl, 45.67.

The proton magnetic resonance spectrum showed the presence of aromatic protons as an AB pattern at 761.5, 753, 715.5 and 707 Hz and bridgehead protons as a singlet at 399 Hz in the ratio of two to one as required by the structure of the subject dicarboximide.

The compounds of this invention are useful as flame retardant additives for polymeric materials such as polyurethanes, polypropylene, EPDM type elastomers and the like. The following examples illustrate this utility. Unless otherwise stated, all parts are by weight of additive per 100 parts of polymer. All polymeric compositions were mixed on a two-roll rubber mill using conventional procedures. The polymeric mixtures were then compression molded and test pieces were fashioned from the compression moldings. The test pieces were tested for flame retardance in accordance with the following test procedures: (1) American Society for Testing Materials, ASTM D-2863, the oxygen index method; and (2) Underwriter's Laboratories Subject 94(V) [UL-94 (V)], a vertical burning test. The several categories of ratings for the UL-94(V) test and their meanings are given below:

| Rating | Meaning |
| --- | --- |
| D | Dripping. |
| ND | Non-dripping. |
| B | Sample consumed completely by burning. |
| SE | Self-extinguishes after 30 seconds. |
| VE-O | Extinguishes within 5 seconds, and no flaming drip. |
| VE-I | Extinguishes within 30 seconds, and no flaming drip. |
| VE-II | Extinguishes within 30 seconds, and drips. |

EXAMPLE 5

This example illustrates the use of the compounds of the invention alone and in combination with chlorinated polyethylene and antimony trioxide in Roylar E-85, a polyurethane elastoplastic (polytetramethylene ether glycol based). Roylar E-85 is characterized by a specific gravity of 1.12; a durometer hardness (ASTM D-2240) of 85A; and a solenoid brittle point (ASTM D-746) of less than −90° F. Using a conventional two-roll rubber mill, the additives were added to the Roylar E-85 at a temperature of 320° F., fluxed for 10 minutes, cooled to room temperature and 5 × 5 × ⅛ inch plaques compression molded from the mixed stocks. Test strips were cut from the compression molded plaques and evaluated for fire retardance according to: (1) the Underwriters Laboratories, Subject 94(V) test, a vertical burning test using three 5 × ½ × ⅛ inch test samples; and (2) the ASTM D-2863 "Oxygen Index" using a 2½ × ½ × ⅛ inch test sample. The additive CPE is a chlorinated polyethylene containing 48% chlorine available from Dow Chemical Corporation under the designation CPE 4814. The results are shown below in Table I.

TABLE I

| Code | Additive | pph | D-2863 Oxygen Index | UL 94 (V) (⅛") |
|------|----------|-----|---------------------|----------------|
| A-0 | None | — | 20.0 | B (D) |
| A-1 | CPE | 40 | 22.0 | B (ND) |
| A-2 | CHT | 40 | 24.0 | SE (D) |
| A-3 | CHT, CPE | 20, 20 | 26.5 | VEI (ND) |
| A-4 | CHT, CPE, Sb$_2$O$_3$ | 20, 20, 3 | 30.0 | VEO (ND) |
| A-5 | CHT, Sb$_2$O$_3$ | 25, 10 | 29.6 | VEO (D) |
| A-6 | LYT | 40 | 24.5 | SE (D) |
| A-7 | LYT, CPE | 20, 20 | 26.7 | VEI (ND) |
| A-8 | LYT, CPE, Sb$_2$O$_3$ | 20, 20, 3 | 29.1 | VEO (ND) |
| A-9 | SOT, CPE | 20, 20 | 25.4 | SE (ND) |
| A-10 | SOT, CPE, Sb$_2$O$_3$ | 20, 20, 5 | 29.5 | VEO (ND) |

In this and/or the following Examples, the following designations are used to identify the products of Examples 1–4:
LYT Product of Example 2
SOT Product of Example 3
CHT Product of Example 4

As shown in Table I, all three compounds of the invention, CHT, LYT and SOT, exhibit outstanding flame retardancy when incorporated into polyurethane elastoplastics. Additives CHT and LYT at the 40 pph level show a higher oxygen index than CPE (A-2 and A-6 vs. A-1). It is to be noted that the chlorine content of CHT and LYT (44.7%) is lower than that of CPE (48%). In addition, while the CPE stock (code A-1) was completely consumed, the CHT and LYT stocks were self-extinguishing after 30 seconds. Stocks A-3 and A-7 in which the chemicals of the invention were present along with an equal amount of CPE show an unexpected synergism as evidenced by a significant increase in the oxygen index. The two stocks, A-3 and A-7, extinguished within 30 seconds and a third, A-9, extinguished after 30 seconds and all three did not drip. Stocks A-4, A-8, and A-10 demonstrate the enhanced flame retardancy to be gained by the inclusion of an antimony compound such as antimony trioxide along with chlorinated polyethylene.

EXAMPLE 6

This example compares the flame retardancy of the chemicals of this invention to that of some widely used commercial halohydrocarbyl fire retardant chemicals in a polyurethane elastoplastic such as Roylar E-85. Cloran (trademark, Universal Oil Products Corp.) is 2,3-dicarbonyl-5,8-endomethylene-5,6,7,8,9,9-hexachloro-1,2,3,4,4a,5,8,8a-octahydronaphthalene anhydride. Dechlorane 602 (trademark, Hooker Chemical Corp.) is a cycloaliphatic chloride: m. pt.: 290°–293° C.; density (gms/cc) at 25° C. = 2.0; chlorine content (%) = 69.4. Dechlorane 25 (trademark, Hooker Chemical Corp.) is 1,4:7,10-dimethanocycloocta-1,2,3,4,7,8,9,10,13,13,14,14-dodecachloro-1,4,4a,5,6,-,6a,7,10,10a,11,12,12a-dodecahydro-1,2:5,6-dibenzene (% chlorine = 65). The mixing, molding and fashioning of the test samples was the same as in Example 5. The results are shown below in Table II.

TABLE II

| Code | Additive | pph | D-2863 Oxygen Index | UL94 (V) (⅛")* |
|------|----------|-----|---------------------|----------------|
| B-1 | CHT, CPE | 20, 20 | 26.5 | VEI (ND) |
| B-2 | CHT, CPE, Sb$_2$O$_3$ | 20, 20, 3 | 30.0 | VEO (ND) |
| B-3 | LYT, CPE | 20, 20 | 26.7 | VEI (ND) |
| B-4 | LYT, CPE, Sb$_2$O$_3$ | 20, 20, 3 | 29.1 | VEO (ND) |
| B-5 | SOT, CPE | 20, 20 | 25.4 | SE (ND) |
| B-6 | SOT, CPE, Sb$_2$O$_3$ | 20, 20, 5 | 29.5 | VEO (ND) |
| B-7 | Dechlorane 602, CPE | 20, 20 | 23.0 | B (D) |
| B-8 | Dechlorane 602, CPE, Sb$_2$O$_3$ | 43, 20, 5 | 29.6 | VEO (ND) |
| B-9 | Dechlorane 25, CPE | 20, 20 | 23.0 | B (D) |
| B-10 | Dechlorane 25, CPE, Sb$_2$O$_3$ | 43, 20, 5 | 29.1 | VEI (ND) |
| B-11 | Cloran, CPE | 20, 20 | 22.0 | B (D) |
| B-12 | Cloran, CPE, Sb$_2$O$_3$ | 20, 20, 5 | 26.0 | B (ND) |

*Sample size: 5" × ½" × ⅛".

As shown in Table II, the chemicals of the invention are superior to the commercial flame retardants when used in conjunction with CPE at the same add-on level. This is evidenced by (1) the higher oxygen index values 26.5 (B-1), 26.7 (B-3) and 25.4 (B-5) vs. 23 (B-7), 23 (B-9) and 22 (B-11); and (2) the self-extinguishing and non-dripping properties of B-1, B-3 and B-5 as compared to B-7, B-9 and B-11, all of which burned completely and dripped.

Thus, quite unexpectedly, the presence of a mercapto or disulfide group in the chemicals of the invention would appear to result in a much stronger synergism than that exhibited by the chlorinated hydrocarbon type of fire retardant chemicals. This unexpectedly stronger synergism persists when the compounds of this invention are used in conjunction with chlorinated polyethylene and antimony trioxide. At least 43 parts of each of such commercial fire retardants as Dechlorane 602 and Dechlorane 25 are required along with 20 parts of chlorinated polyethylene and 5 parts of antimony trioxide in order to raise the "oxygen index" to the same value (ca. 29) that is attainable with only 20 parts of the chemicals of this invention (B-8 and B-10 vs. B-2, B-4 and B-6).

EXAMPLE 7

This example demonstrates the use of the chemicals of this invention to impart flame retardancy to EPDM type elastomers and polyolefin thermoplastics. The EPDM stocks were mixed on a conventional two-roll rubber mill and cured for 45 minutes at 320° F. in a compression mold. The polyolefin stocks were mixed on a conventional two-roll rubber mill at 360° F. and compression molded at 370° F. The recipes, "oxygen index" and burning characteristics of the test samples are given below in Table III.

TABLE III

|  | C-1 | C-2 | C-3 | C-4 | C-5 |
|---|---|---|---|---|---|
| Royalene (1) | 100 | 100 | | | |
| Polypropylene (2) | | | 100 | 100 | 100 |
| CHT | 30 | | 24 | | |
| Dechlorane 602 | | 30 | | 24 | |
| Cloran | | | | | 24 |
| $Sb_2O_3$ | 15 | 15 | | | |
| Royalac 134 (3) | 2.4 | 2.4 | | | |
| MBT (4) | 1.5 | 1.5 | | | |
| Butazate (5) | 1.5 | 1.5 | | | |
| Sulfur | 1 | 1 | | | |
| ESEN (6) | 0.9 | 0.9 | | | |
| Oxygen Index | 25.8 | 23.7 | 25.0 | 24.5 | 23.2 |
| UL-94 (V) (⅛") | BD | BD | BD | BD | BD |

(1) Royalene 501 is a rubbery polymer of ethylene, propylene and a controlled amount of a non-conjugated diene from Uniroyal Chemical Division of Uniroyal, Inc. The Mooney Viscosity (ML-4 at 212° F.) is 55, specific gravity is 0.865 and the Iodine Number is 10.
(2) Hercules Profax 6523, a general purpose propylene homopolymer: density = 0.902; melt flow [(cond. L) ASTM.D-1238] = 4; Tensile strength at yield (ASTM D-638) = 5400 psi.
(3) Royalac 134 is a mixture of 50% zinc dimethyldithiocarbamate and 50% tetramethyl-thiuramdisulfide.
(4) MBT is 2-mercaptobenzothiazole.
(5) Butazate is zinc dibutyldithiocarbamate.
(6) ESEN is phthalic anhydride.

As shown in Table III, in conjunction with antimony trioxide, the chemicals of the invention impart superior flame retardancy to EPDM type elastomers (C-1 vs. C-2) as evidenced by the higher oxygen index. Without the use of antimony trioxide, this same superiority obtains in polypropylene (C-3 vs. C-4 and C-5).

What is claimed is:
1. A compound having the formula:

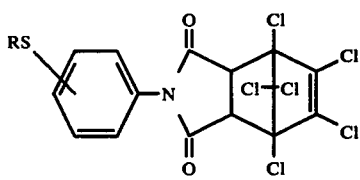

wherein R is H or

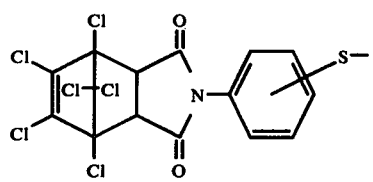

and RS— is in the ortho- or the para- position.

2. A compound having the formula:

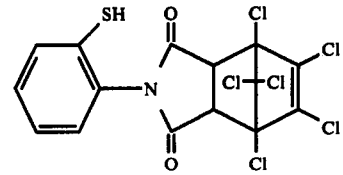

3. A compound having the formula:

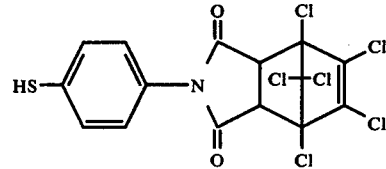

4. A compound having the formula:

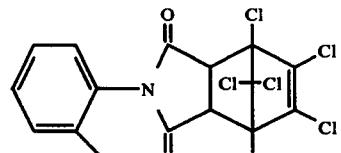

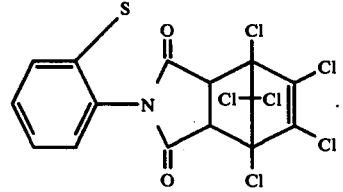

5. A compound having the formula:

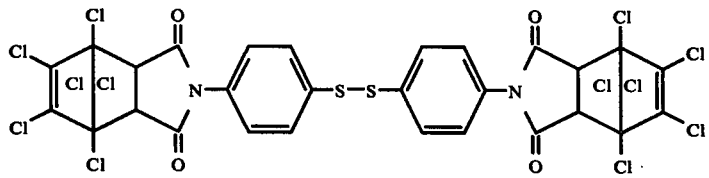

6. A flame retardant polymeric composition comprising a polyurethane elastoplastic, from about 5 to about 50% by weight, based on the total composition, of a compound of claim 1 and from about 5 to about 50% by weight, based on the total composition, of chlorinated polyethylene.

7. The composition of claim 6 also containing from about 1 to about 30% by weight, based on the total composition, of a metallic compound wherein the metal is selected from the group consisting of antimony, arsenic and bismuth.

8. The composition of claim 6 in which are present from about 1 to about 30% by weight, based on the total composition, of antimony trioxide and from about 5 to about 50% by weight, based on the total composition, of chlorinated polyethylene.

9. The composition of claim 6 in which is present about 20% by weight, based on the total composition, of chlorinated polyethylene.

* * * * *